(12) United States Patent
Akasaka et al.

(10) Patent No.: US 10,043,262 B2
(45) Date of Patent: Aug. 7, 2018

(54) ABNORMAL IMAGE DETECTION DEVICE, IMAGE PROCESSING SYSTEM HAVING ABNORMAL IMAGE DETECTION DEVICE, AND VEHICLE INCORPORATING IMAGE PROCESSING SYSTEM

(71) Applicant: YAMAHA HATSUDOKI KABUSHIKI KAISHA, Iwata-shi, Shizuoka (JP)

(72) Inventors: Takashi Akasaka, Iwata (JP); Takahiro Ishii, Iwata (JP)

(73) Assignee: YAMAHA HATSUDOKI KABUSHIKI KAISHA, Iwata-shi, Shizuoka (JP)

( * ) Notice: Subject to any disclaimer, the term of this patent is extended or adjusted under 35 U.S.C. 154(b) by 0 days.

(21) Appl. No.: 15/221,591

(22) Filed: Jul. 27, 2016

(65) Prior Publication Data

US 2017/0032517 A1    Feb. 2, 2017

(30) Foreign Application Priority Data

Jul. 29, 2015   (JP) .................. 2015-149524
Aug. 7, 2015    (JP) .................. 2015-157183
(Continued)

(51) Int. Cl.
*G06T 7/00*    (2017.01)
*G06T 7/593*   (2017.01)
(Continued)

(52) U.S. Cl.
CPC .............. *G06T 7/0008* (2013.01); *B60R 1/00* (2013.01); *G06K 9/00805* (2013.01);
(Continued)

(58) Field of Classification Search
CPC . G06T 2207/30261; G06T 2207/10021; G06T 7/593; G06T 7/0008; H04N 13/0203; G08G 1/16; B60R 1/00; B60R 2300/307
See application file for complete search history.

(56) References Cited

U.S. PATENT DOCUMENTS 6,310,546 B1 * 10/2001 Seta ..................... G07C 5/0891
                                                340/507
8,515,610 B2 *  8/2013 Sung ................... G05D 1/0223
                                                701/23
(Continued)

FOREIGN PATENT DOCUMENTS

CN    102646343 A    8/2012
CN    103092202 B    7/2015
(Continued)

OTHER PUBLICATIONS

Fradi Hajer et al: "Improved depth map estimation in stereo vision", Stereoscopic Displays and Applications XXII, SPIE, 1000 20th St. Bellingham WA 98225-6705 USA, vol. 7863, No. 1, Feb. 10, 2011 (Feb. 10, 2011), pp. 1-7, XP060006228, DOI: 10.1117/12.872544.

*Primary Examiner* — Mia M Thomas
(74) *Attorney, Agent, or Firm* — Rabin & Berdo, P.C.

(57) ABSTRACT

An abnormal image detection device includes a reliability determination part that determines whether or not each pixel of a parallax image has a low reliability. The reliability determination part has an edge intensity determination section. For each respective pixel of original images, the edge intensity determination section determines whether or not the respective pixel is smaller than or equal to a threshold value, and if the respective pixel is smaller than or equal to the threshold value, the reliability determination part determines that a corresponding one of the pixels in the parallax image, which corresponds to the respective pixel, is a pixel having the low reliability. A computation part computes a
(Continued)

total number of pixels of the parallax image that each has the low reliability. An abnormality determination part that when the total number of pixels exceeds a predetermined value, determines that the parallax image is abnormal.

15 Claims, 10 Drawing Sheets

(30) Foreign Application Priority Data

| Sep. 7, 2015 | (JP) | 2015-175792 |
|---|---|---|
| Mar. 7, 2016 | (JP) | 2016-043199 |
| Jun. 28, 2016 | (JP) | 2016-127534 |

(51) Int. Cl.
  *B60R 1/00* (2006.01)
  *H04N 13/02* (2006.01)
  *G06K 9/00* (2006.01)
  *G08G 1/16* (2006.01)

(52) U.S. Cl.
  CPC ......... *G06T 7/593* (2017.01); *H04N 13/0203* (2013.01); *B60R 2300/307* (2013.01); *G06T 2207/10021* (2013.01); *G06T 2207/30261* (2013.01); *G08G 1/16* (2013.01)

(56) References Cited

U.S. PATENT DOCUMENTS

| 9,565,363 | B1* | 2/2017 | Hatao | G01B 11/14 |
|---|---|---|---|---|
| 9,659,379 | B2* | 5/2017 | Sekiguchi | G06T 7/44 |
| 9,667,943 | B2* | 5/2017 | Izawa | H04N 13/0203 |
| 9,672,446 | B1* | 6/2017 | Vallespi-Gonzalez | G06K 9/6267 |
| 9,734,392 | B2* | 8/2017 | Suzuki | G06K 9/00355 |
| 9,749,535 | B1* | 8/2017 | Hatao | H04N 5/23267 |
| 9,767,367 | B2* | 9/2017 | Ishigami | G06T 7/292 |
| 2002/0018119 | A1* | 2/2002 | Kogure | G06T 7/0002 348/148 |
| 2002/0018120 | A1* | 2/2002 | Kogure | B60Q 9/008 348/148 |
| 2009/0187308 | A1* | 7/2009 | Morimitsu | B60R 1/00 701/36 |
| 2013/0215235 | A1* | 8/2013 | Russell | H04N 13/0203 348/47 |
| 2013/0307935 | A1* | 11/2013 | Rappel | A61B 1/00048 348/46 |
| 2014/0192162 | A1* | 7/2014 | Aoki | G02B 7/34 348/46 |
| 2014/0285667 | A1* | 9/2014 | Aimura | G08G 1/166 348/148 |
| 2015/0124060 | A1* | 5/2015 | Hasegawa | G03B 35/08 348/47 |
| 2015/0181089 | A1* | 6/2015 | Mirlay | G02B 27/1066 348/46 |
| 2015/0181196 | A1* | 6/2015 | Izawa | G03B 13/18 348/46 |
| 2015/0343951 | A1* | 12/2015 | Kim | B60R 1/00 701/42 |
| 2016/0005180 | A1* | 1/2016 | Matono | G06T 7/0075 348/47 |
| 2016/0104274 | A1* | 4/2016 | Jovanovski | G05B 19/402 348/46 |
| 2016/0137125 | A1* | 5/2016 | Petrany | B60R 1/00 348/148 |
| 2016/0283791 | A1* | 9/2016 | Ogura | A01G 7/00 |
| 2017/0032517 | A1* | 2/2017 | Akasaka | B60R 1/00 |
| 2017/0053169 | A1* | 2/2017 | Cuban | H04N 7/185 |
| 2017/0053382 | A1* | 2/2017 | Lelescu | H04N 13/0029 |
| 2017/0138868 | A1* | 5/2017 | Barak | G01N 21/95692 |
| 2017/0174022 | A1* | 6/2017 | Hu | G06T 7/74 |
| 2017/0174128 | A1* | 6/2017 | Hu | B60R 1/00 |
| 2017/0174130 | A1* | 6/2017 | Hu | B60R 1/00 |
| 2017/0177949 | A1* | 6/2017 | Hu | G06K 9/00791 |
| 2017/0345306 | A1* | 11/2017 | Mutou | G08G 1/16 |
| 2018/0031848 | A1* | 2/2018 | Huang | G02B 27/0179 |
| 2018/0058044 | A1* | 3/2018 | Deguchi | E02F 9/261 |

FOREIGN PATENT DOCUMENTS

| EP | 2670147 A2 | 12/2013 |
|---|---|---|
| JP | H07-108937 A | 4/1995 |
| JP | 2009-271608 A | 11/2009 |
| JP | 2014-006243 A | 1/2014 |
| JP | 2015-149524 A | 8/2015 |
| JP | 2015-157183 A | 9/2015 |
| JP | 2015-175792 A | 10/2015 |
| JP | 2016-043199 A | 4/2016 |
| KR | 101319526 B1 | 10/2013 |
| KR | 101463464 B1 | 11/2014 |
| TW | 375583 | 12/1999 |
| TW | M335688 U | 7/2008 |
| TW | 2011-07913 A | 3/2011 |
| TW | 2011-39177 A | 11/2011 |
| TW | 2012-48124 A | 12/2012 |
| TW | 2013-24459 A | 6/2013 |
| TW | 2014-44543 A | 12/2014 |
| TW | 2015-11997 A | 4/2015 |
| TW | 2015-20581 A | 6/2015 |

* cited by examiner

Wd

W

W u-coordinate →

W

Parallax distribution

Parallax distribution

ABNORMAL IMAGE DETECTION DEVICE, IMAGE PROCESSING SYSTEM HAVING ABNORMAL IMAGE DETECTION DEVICE, AND VEHICLE INCORPORATING IMAGE PROCESSING SYSTEM

CROSS-REFERENCE TO RELATED APPLICATION

This application claims priority under 35 U.S.C. § 119 from Japanese Patent Application No. JP2015-149524, filed on Jul. 29, 2015; Japanese Patent Application No. JP2015-157183, filed on Aug. 7, 2015; Japanese Patent Application No. 2015-175792, filed on Sep. 7, 2015; Japanese Patent Application No. 2016-043199, filed on Mar. 7, 2016; and Japanese Patent Application No. 2016-127534, filed on Jun. 28, 2016, which are hereby incorporated by reference.

BACKGROUND OF THE INVENTION

Field of the Invention

The present invention relates to an abnormal image detection device which detects an abnormality in a parallax image and original images relating to preparation of the parallax image, an image processing system having the abnormal image detection device and a vehicle incorporating the image processing system.

Description of the Related Art

A vehicle with a stereo camera capable of obtaining the distance to a subject on the basis of a parallax image (a "parallax image" is also called a "depth image") prepared from images taken by using a plurality of image pickup parts has been proposed.

Possible causes of abnormalities in a stereo camera mounted to a vehicle include, for example, failure to accurately compute a depth distance as a result of use of a parallax image prepared on the basis of images taken under a severe brightness/darkness condition, e.g., a back-lighted or dark condition, as well as malfunctions of the stereo camera (e.g., optical, mechanical and electrical malfunctions).

An abnormality diagnosis device capable of determining abnormal conditions of a stereo camera without being influenced by a severe brightness/darkness condition such as a back-lighted or dark condition has been proposed (see, for example, Japanese Patent Laid-Open No. 2014-6243).

Patent Document 1: Japanese Patent Laid-Open No. 2014-6243.

With a stereo camera mounted to a vehicle, there is a possibility of images of substantially different scenes being taken with left and right cameras. For example, when images are taken while an extraneous material is attached to only one of two cameras, the correct parallax value (parallax image) cannot be obtained through stereo matching because the texture is reduced. In a certain case other than the case where an extraneous material is attached, there is also a possibility of taking images of different scenes with the left and right cameras.

In the abnormality diagnosis device described in Patent Literature mentioned above, an abnormality in parallax image data is determined from a parallax value distribution and the amount of change in the parallax value distribution (a parallax value image of an Nth frame and the amount of change of a parallax value image of an (N+1)th frame). A concrete method for this determination is as shown in (1) to (4): (1) determination is made as to whether a parallax is detected, (2) determination is made as to whether there is a parallax equal to or larger than the maximum parallax value, (3) determination is made as to whether the number of parallax value peaks equal to or larger than a threshold value, and (4) determination is made as to whether the degree of similarity in parallax value distribution to the preceding frame is low. However, it is difficult for the determination method as described in (1) to (4) to make determination as to whether or not parallax image data for an image taken under the above-described "condition in which an extraneous material is attached to only one of the two cameras" is abnormal. There is a possibility of all the determination results being "NO" and the parallax image data being determined as normal.

An object of the present invention is to provide an abnormal image detection device capable of detecting an abnormal image on the basis of the total number of pixels having low reliability when an image of a scene is taken with one of a plurality of image pickup parts as a scene substantially different from that taken by other image pickup parts. Another object of the present invention is to provide an image processing system having the abnormal image detection device. Still another object of the present invention is to provide a vehicle incorporating the image processing system.

SUMMARY OF THE INVENTION

According to the present invention, there is provided an abnormal image detection device that detects whether or not at least one of a plurality of original images is abnormal, the plurality of original images being obtained from an image pickup detector and used to prepare a parallax image, the parallax image having a plurality of pixels, the abnormal image detection device comprising:

a reliability determination part that determines whether or not each of the pixels of the parallax image has a low reliability, the reliability determination part having an edge intensity determination section that for each respective pixel of the original images, determines whether or not the edge intensity of the respective pixel is smaller than or equal to a threshold value, and if the edge intensity of the respective pixel is smaller than or equal to the threshold value, determines that one of the pixels in the parallax image, which corresponds to the respective pixel, has the low reliability;

a computation part that computes a total number of pixels which each has the low reliability as determined by the reliability determination part; and an abnormality determination part that determines that the parallax image is abnormal, when the total number of pixels computed by the computation part exceeds a predetermined value.

In the above-described arrangement, the reliability determination part determines the reliability of pixels of the parallax image by using pixels of the original images relating to preparation of the parallax image (a "parallax image" is also called a "depth image"). Pixels having weak edges are determined as pixels having low reliability (low-reliability pixels), and the parallax image is determined as abnormal when the total number of pixels having low reliability exceeds a predetermined value. An abnormal parallax image can therefore be detected with an accuracy even in a case where an image (original image) of a scene is taken by one of the plurality of image pickup parts as a scene substantially different from that taken by other image pickup parts. If a depth distance is computed from a parallax image prepared by using low-reliability pixels without changing the low-reliability pixels, the accuracy of the distance is low, resulting in a reduction in the accuracy of detection of an obstacle.

The edge intensity determination section may determine each respective the edge intensity of pixel of the original image. It may be determined that the pixel of the parallax image, which corresponded to the pixel of the original image determined that the edge intensity of the pixel of the original is at least smaller than or equal to a threshold value, is the pixel having low reliability.

When the edge intensities of each one of pixels of original image are determined, the pixels are, for example, the pixels in the entire region of the original image, the pixels in a partial region or the pixels in a central region defined by removing an end region from the entire region. In the end region, the plurality of image pickup parts have different image pickup areas. It is, therefore, preferable to exclude the end region in advance.

The "threshold value" in "the edge intensity . . . is at least smaller than or equal to a threshold value" is a value set in advance. For example, as this value, a value obtained empirically or experimentally can be adopted. For example, the edge intensities of images or parallax images taken during a test run are obtained, and a threshold value can be set from indexes for example the average of edge intensities, maximum of edge intensities, minimum of edge intensities, or standard deviation of edge intensities.

In one embodiment of the invention described above, the reliability determination part has a parallax value determination section which determines that the pixel has low reliability when the parallax value of each one of pixels of the parallax image is out of a predetermined range.

The parallax value determination section may determine a parallax value of each of the pixels of the parallax image, determine whether each parallax value is out of a predetermined range, and in each instance that a respective one of the parallax values is out of the predetermined range, determine that the pixel of the parallax image, which corresponds to the respective one of the parallax values, has the low reliability.

This arrangement enables, as well as edge intensity determination, recognizing pixels having parallax values out of the predetermined range as low-reliability pixels and determining that the parallax image is abnormal when the total number of low reliability pixels exceeds a predetermined value. Even in a case where no abnormality can be detected by edge intensity determination, an abnormal parallax image can be determined by this parallax value determination. Inclusion of edge intensity determination and parallax value determination enables making parallax image abnormality determination with improved reliability.

When the parallax values of each one of pixels of the parallax image are determined, the pixels are, for example, the pixels in the entire region of the parallax image, the pixels in a partial region or the pixels in a central region defined by removing an end region from the entire region. In the end region, the plurality of image pickup parts have different image pickup areas. It is, therefore, preferable to exclude the end region in advance.

The "predetermined range" in "parallax values . . . the predetermined range" is defined by values set in advance. For example, as these values, values obtained empirically or experimentally can be adopted. The predetermined range is defined by threshold values for upper and lower limits. However, the predetermined range may alternatively defined by only an upper-limit threshold value or a lower-limit threshold value.

In one embodiment of the invention described above, the above-described parallax image may include at least a first parallax image (Ab) prepared based upon a first original image (A) of the plurality of original images and a second parallax image (Ba) prepared based upon a second original image (B) of the plurality of original images. The reliability determination part may have a parallax value difference determination section that determines when a difference (d1−d2) is out of a predetermined range, that a first pixel (pA) of the first parallax image (Ab) has low reliability. The d1 is a parallax value of the first pixel (pA) of the first parallax image (Ab). The d2 is a parallax value of a second pixel (pB) of the second parallax image (Ba). The second pixel (pB) corresponds to the first pixel (pA).

This arrangement enables, as well as edge intensity determination or edge intensity determination and parallax value determination, recognizing pixels having the difference (d1−d2) between the first and second parallax values out of the predetermined range as low reliability pixels and determining that the parallax image is abnormal when the total number of low reliability pixels exceeds a predetermined value. Even in a case where no abnormality can be detected by edge intensity determination or by parallax value determination, an abnormal parallax image can be determined by this parallax value difference determination. Inclusion of edge intensity determination, parallax value determination and parallax value difference determination enables making parallax image abnormality determination with further improved reliability. For example, the first original image (A) and the second original image (B) may be a left original image and a right original image, respectively.

The first pixel (pA) is, for example, each pixel in the entire region of the first parallax image (Ab), each pixel in a partial region or each pixel in a central region defined by removing an end region from the entire region. In the end region, the plurality of image pickup parts have different image pickup areas. It is, therefore, preferable to exclude the end region in advance.

The "predetermined range" in "the difference (d1−d2) . . . the predetermined range" is defined by values set in advance. For example, as these values, values obtained empirically or experimentally can be adopted. The predetermined range is defined by threshold values for upper and lower limits. However, the predetermined range may alternatively defined by only an upper-limit threshold value or a lower-limit threshold value, for example, by the upper-limit threshold value.

In one embodiment of the invention described above, the plurality of image pickup parts are, for example, a stereo camera formed of image pickup parts disposed in left and right positions, a stereo camera formed of image pickup parts disposed in upper and lower positions, a stereo camera formed of three image pickup parts disposed at the vertices of a regular triangle, or a stereo camera having three or more image pickup parts.

In one embodiment of the invention described above, the abnormal image detection device further has a storage part that stores at least one group of data selected from the original images, edge-enhanced images formed by performing edge-enhancing processing on the original images, and the parallax image. The storage part may be a temporary storage part.

In one embodiment of the invention described above, the abnormal image detection device further has an acquisition part that receives from an external device at least one group of data selected from the original images, edge-enhanced images formed by performing edge-enhancing processing on the original images, and the parallax image. The acquisition part is, for example, a communication means (wireless, wired) or a means for reading a storage medium.

According to another aspect of the present invention, there is provided an image processing system having a plurality of image pickup parts, a parallax image preparation part that prepares a parallax image on the basis of a plurality of original images obtained from the image pickup parts, and a distance computation part that computes a depth distance on the basis of the parallax image prepared by the parallax image preparation part, the image processing system including the abnormal image detection device described above, and an output part that outputs abnormality information when the abnormal image detection device detects an abnormality in the parallax images. In one embodiment, the image processing system further has an image correction part that performs correction processing on the plurality of original images. The correction processing is, for example, edge-enhancement processing for enhancing edges.

In one embodiment, the distance computation part may compute a depth distance on the basis of the parallax image formed by removing pixels having low reliability. The parallax image is prepared by the parallax image preparation part. The pixel having low reliability is the pixel determined by the reliability determination part that the pixel has low reliability.

In one embodiment, the distance computation part may compute a depth distance on the basis of a parallax image other than the parallax image in which an abnormality has been detected.

In one embodiment, when computing a depth distance by using a parallax image in which an abnormality has been detected, the distance computation part uses a parallax image formed by removing pixels having low reliability.

According to still another aspect of the present invention, there is provided a vehicle incorporating the above-described image processing system. In one embodiment, the vehicle has a front windshield in front of the image pickup parts in the image pickup direction, and has no windshield wiper on the front windshield.

According to the present invention, an abnormal image detection device capable of detecting an abnormal image on the basis of the total number of pixels having low reliability when an image of a scene is taken with one of a plurality of image pickup parts as a scene substantially different from that taken by other image pickup parts. An image processing system having the abnormal image detection device can also be provided. A vehicle incorporating the image processing system can also be provided.

DETAILED DESCRIPTION OF THE PREFERRED EMBODIMENTS (Embodiment 1)

A vehicle having an abnormal image detection device according to Embodiment 1 will be described with reference to the drawings. An autonomously-traveling golf cart will be described below as the vehicle by way of example. The vehicle, however, is not limited to the golf cart and may be any type of vehicle which autonomously travels (e.g., car, motorcycle, scooter, watercraft, etc.). "Front/rear" and "left/right" are defined with respect to the direction in which the vehicle travels. For the description of the present embodiment, an image in a state with an attached extraneous material is used as an image of substantially different scene. This kind of image is not exclusively used; any other kind of image representing a substantially different scene may suffice.

(Outline of Construction of Vehicle)

Figure 1A:
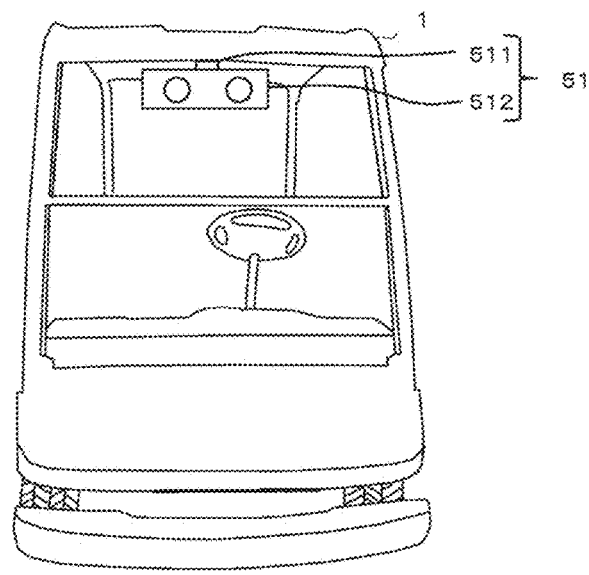
FIG. 1A is a front view of a vehicle according to Embodiment 1.

A vehicle 1 shown in FIG. 1A is a golf cart that travels automatically or is manually operated to travel in a golf course. The vehicle 1 can travel autonomously by being guided with electromagnetic waves emitted from a guide wire embedded under a lane. The vehicle 1 incorporates an image processing system 5 having an image pickup part 51 (which may also be referred to as an image detector), a parallax image preparation part 52 that prepares a parallax image on the basis of a plurality of original images obtained from the image pickup part 51, a distance computation part 53 that computes a depth distance on the basis of the parallax image prepared by the parallax image preparation part 52, an abnormal image detection device 2 that detects whether or not a parallax image prepared on the basis of a plurality of original images obtained from the image pickup part 51 and at least one of the plurality of original images are abnormal, and an output part 54 that outputs abnormality information if the abnormal image detection device 2 detects an abnormality in the parallax image. The image processing system 5 may also have an obstacle detection device 55 that detects an obstacle on the lane on which the vehicle 1 travels. In Embodiment 1, the vehicle 1 is a vehicle guided with a guide wire and capable of traveling autonomously. However, the present invention is not limited to this. The vehicle 1 can also be manually operated by a driver to travel and can travel freely on a lane with no guide wire.

Figure 1B:
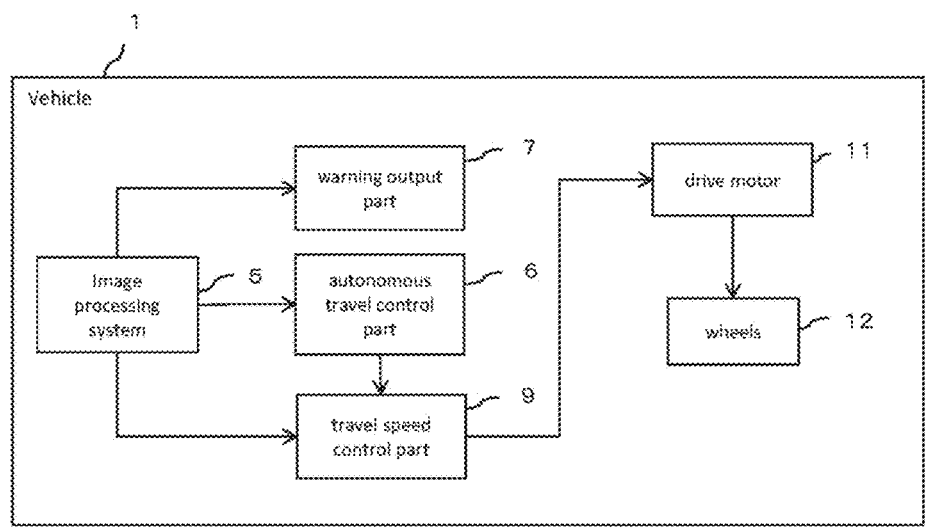
FIG. 1B is a function block diagram of the vehicle according to Embodiment 1.

The vehicle 1 shown in FIG. 1B is also provided with an autonomous travel control part 6 that controls autonomous travel of the vehicle 1 along the guide wire, a warning output part 7 that issues a warning to the driver and surroundings when the obstacle detection device 55 detects an obstacle, a travel speed control part 9 that controls deceleration or stoppage upon detection of an obstacle, and a drive motor 11 that drives wheels 12 and has its rotational speed controlled by the travel speed control part 9. In the present embodiment, the vehicle 1 is driven with the motor. However, the present invention is not limited to this. The vehicle 1 may be driven with an engine.

(Configuration of Image Processing System)

Figure 2:
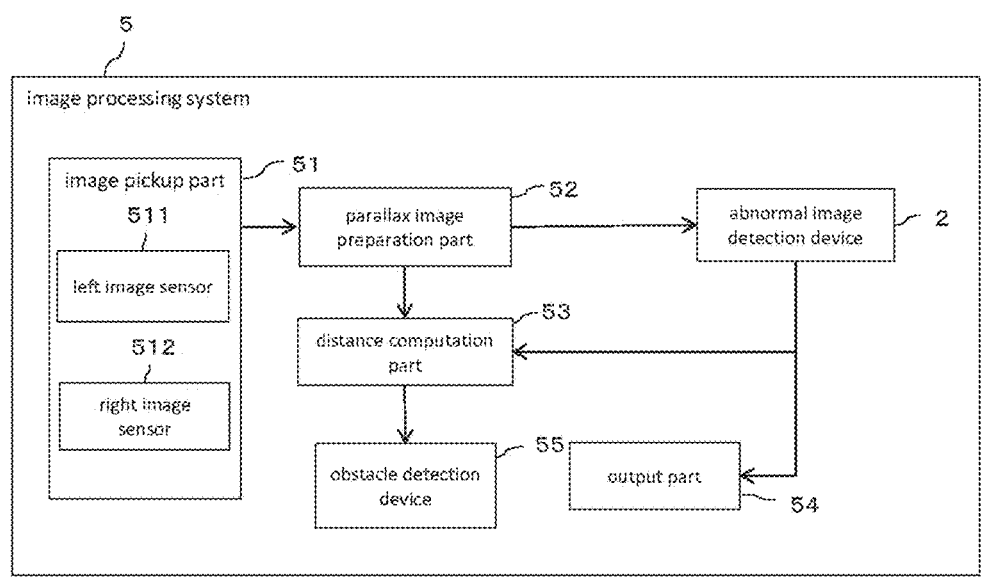
FIG. 2 is a function block diagram of an image processing system according to Embodiment 1.

The image processing system 5 will be described with reference to FIG. 2. The image pickup part 51 is provided at an upper central portion of the front windshield of the vehicle 1. The image pickup part 51 is a stereo camera having a left image sensor 511 and a right image sensor 512. The stereo camera may alternatively be constituted of two or more image sensors. The left image sensor 511 and the right image sensor 512 are, for example, visible-light cameras. The left image sensor 511 and the right image sensor 512 are disposed in a positional relationship such as to obtain parallel stereographic images. In the present embodiment, unless otherwise specially noted, the left image sensor 511 is assumed to be a reference camera, and an image taken with the left image sensor 511 to be a reference image. The image processing system 5 has a microprocessor and a memory, with which the functions of its constituent sections are realized.

Figure 4A:
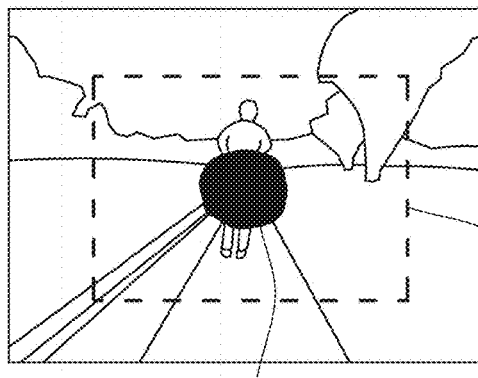
FIGS. 4A and 4B show an example of a left original image and a right original image.
Figure 4B:
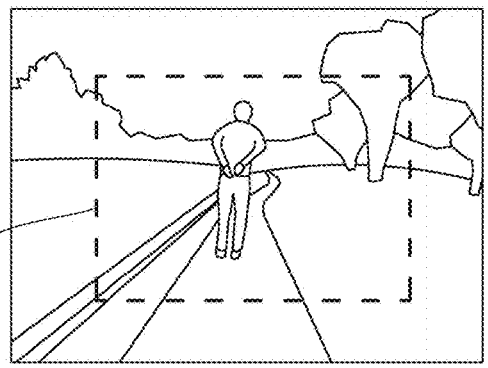

The parallax image preparation part 52 prepares a parallax image by using as a left original image an image taken with the left image sensor 511 and by using as a right original image an image taken with the right image sensor 512. FIG. 4A shows an example of a left original image, and FIG. 4B shows an example of a right original image. A blackened area wd in a central portion of the left original image signifies that the image was taken in a state where an extraneous material is attached to the lens front surface of the left image sensor 511.

Figure 5:
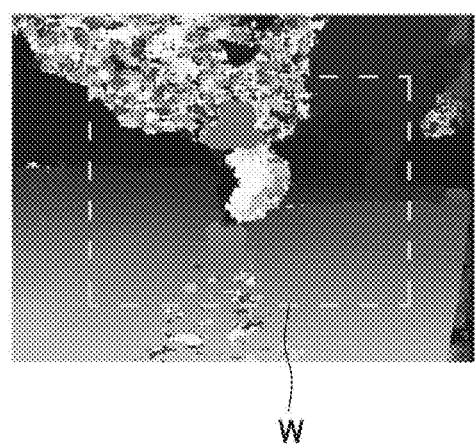
FIG. 5 shows an example of a parallax image prepared by using the original image shown in FIGS. 4A and 4B.

The parallax image preparation part 52 prepares a parallax image by using a left original image as a reference image. Parallax images may be prepared with respect to all frames, or parallax images may be prepared by extracting arbitrary ones of frames. In the present embodiment, parallax images are formed by extracting frames at predetermined intervals. FIG. 5 shows a parallax image prepared by using the left original image and the right original image shown in FIGS. 4A and 4B. The parallax image preparation part 52 also prepares, by using a right original image as a reference image, a parallax image to be used for reliability determination in a parallax value difference determination section. Each parallax image can be prepared, for example, by stereo matching or the like. An area correlation method is used as stereo matching. In the area correlation method, the degree of matching of each image is calculated with respect to a window of a certain size about a remarked pixel, and stereo matching is performed so that the degree of matching is maximized. Further, the parallax of the remarked pixel in the state where the degree of matching is maximized. The parallax thereby computed represents the amount of dislocation of the pixel among the plurality of images. In Embodiment 1, the parallax is the amount of dislocation of the pixel in the right original image (left original image) from the left original image (or right original image) used as a reference image.

The distance computation part 53 computes a depth distance on the basis of a parallax image prepared by the parallax image preparation part 52. Regardless of abnormal parallax image or normal parallax image, the distance computation part 53 computes a depth distance on the basis of parallax image formed by removing pixels having low reliability. In other word, when the pixels having low reliability are included in the normal parallax image, the distance computation part 53 computes a depth distance on the basis of normal parallax image formed by removing pixels having low reliability. When the pixels having low reliability are included in the abnormal parallax image, the distance computation part 53 computes a depth distance on the basis of abnormal parallax image formed by removing pixels having low reliability. Because of the avoidance of use of the pixels having low reliability, the depth distance can be obtained with high accuracy. The depth distance is provided to the obstacle detection device 55 and the travel speed control part 9 for example.

The output part 54 outputs abnormality information when the abnormal image detection device 2 detects an abnormality in a parallax image. This output is, for example, a display of information on the abnormality on a display means, a sound or speech output through a speaker, an output through a lighting means or information on the abnormality transmitted to an external device.

(Abnormal Image Detection Device)

Figure 3:
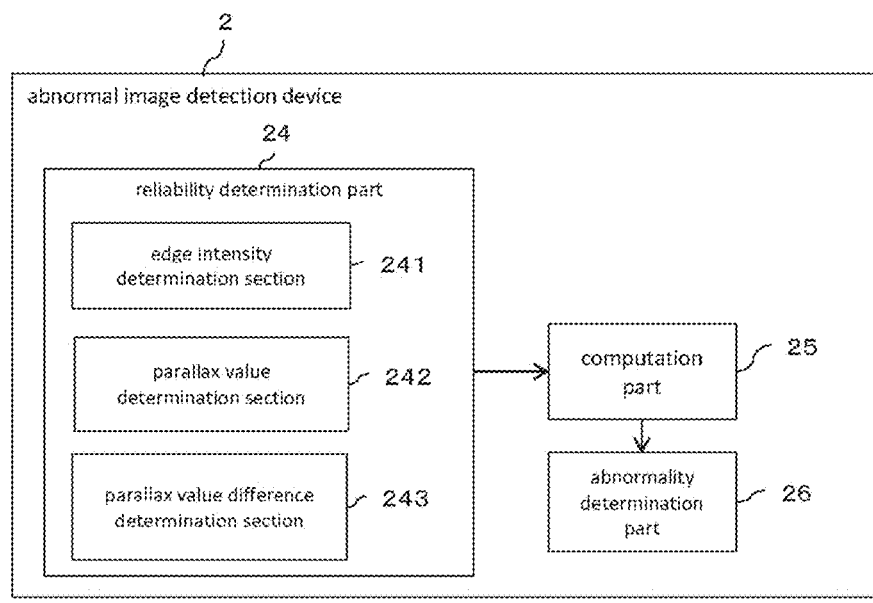
FIG. 3 is a function block diagram of an abnormal image detection device according to Embodiment 1.

The abnormal image detection device 2 shown in FIG. 3 has a reliability determination part 24 that determines whether or not pixels of a parallax image have low reliability, a computation part 25 that computes the total number of pixels having low reliability, determined by the reliability determination part 24, and an abnormality determination part 26 that, when the total number of low reliability pixels obtained by the computation part 25 exceeds a predetermined value, determines that the parallax image is abnormal.

The reliability determination part 24 has an edge intensity determination section 241, a parallax value determination section 242 and a parallax value difference determination section 243. Determination in the determination sections will be described in detail below.

Figure 6:
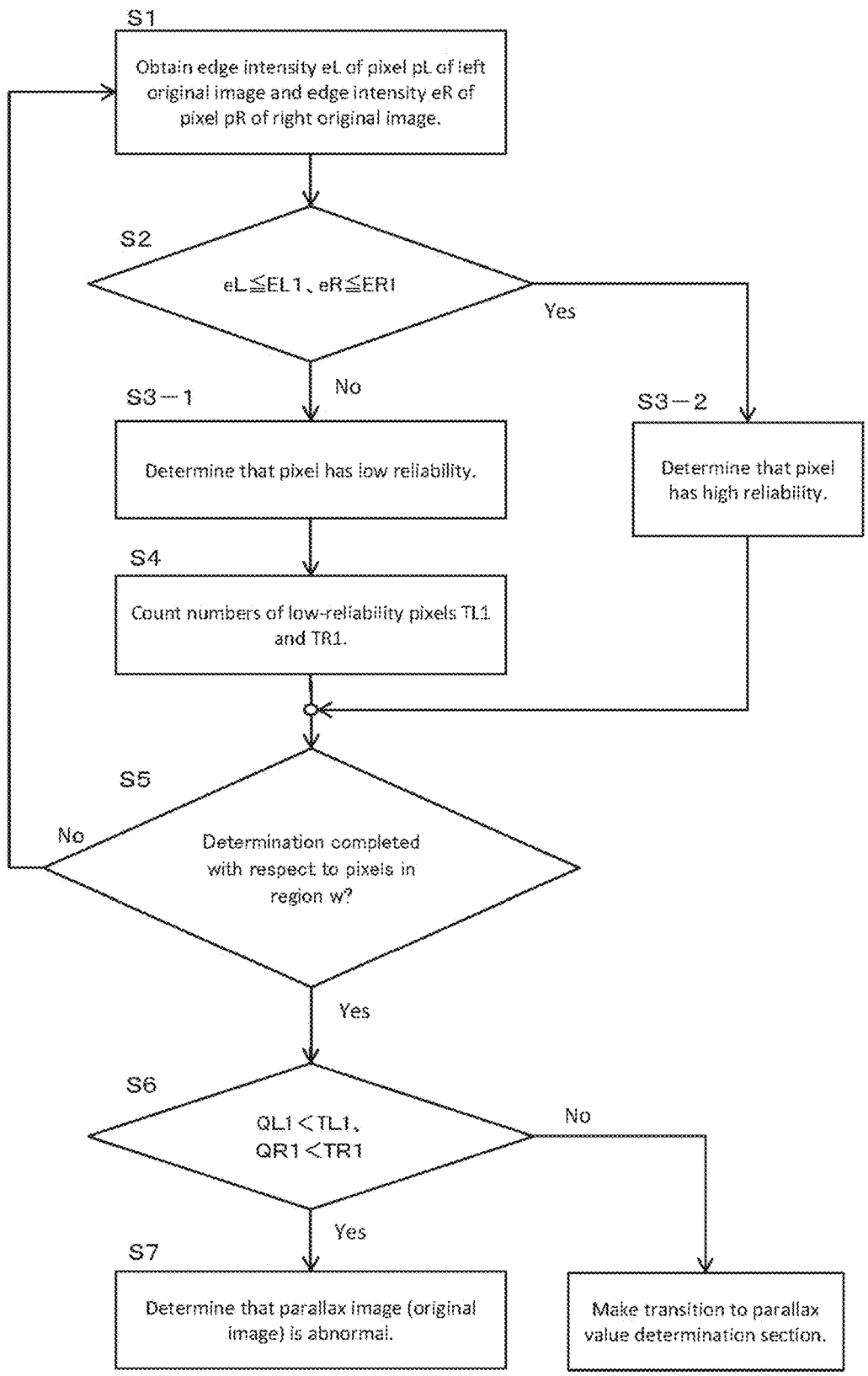
FIG. 6 is a flowchart of reliability determination by an edge intensity determination section.

A method of determination in the edge intensity determination section will be described with reference to FIG. 6. The edge intensity determination section 241 determines, with respect to each of the pixels of a left original image and a right original image corresponding to pixels in a first region w of a parallax image, whether the edge intensity of the pixel is equal to or lower than a threshold value. A description will be given below of a method in which the determination of pixels of a left original image and the determination of pixels of a right original image are made in parallel with each other. The parallax image shown in FIG. 5 is prepared by performing stereo matching on the left original image shown in FIG. 4A and the right original image shown in FIG. 4B. The edge intensity determination section 241 obtains the edge intensity eL (u, v) of the pixels of the left original image corresponding to the pixels p (u, v) in the first region w of the parallax image. Similarly, the edge intensity determination section 241 obtains the edge intensity eR (u, v) of the pixels of the right original image corresponding to the pixels p (u, v) in the first region w of the parallax image (S1). The edge intensity can be obtained by ordinary edge detection.

In the present embodiment, the edge intensity eL (u, v) of the pixels of the left original image and the edge intensity eR (u, v) of the pixels of the right original image corresponding to the pixels p (u, v) in the first region w are obtained. However, the present invention is not limited to this. A modification may be made to the present embodiment such that the edge intensity eL (u, v) of pixels of a left original image corresponding to pixels pL in a region wL of a parallax image is obtained and the edge intensity eR (u, v) of pixels of a right original image corresponding to pixels pR in a region wR (a region different from the region wL) of the parallax image is obtained.

Subsequently, the edge intensity determination section 241 checks whether or not the edge intensity eL is equal to or lower than a threshold value EL1. Similarly, the edge intensity determination section 241 checks whether or not the edge intensity eR is equal to or lower than a threshold value ER1 (S2). The threshold value EL1 and the threshold value ER1 may be equal to or different from each other.

If the edge intensity eL is equal to or lower than the threshold value EL1, the edge intensity determination section 241 determines that the pixel of the left original image is a pixel having low reliability. Similarly, if the edge intensity eR is equal to or lower than the threshold value ER1, the edge intensity determination section 241 determines that the pixel of the right original image is a pixel having low reliability (S3-1). The computation part 25 counts the pixel in the total number TL1 of pixels determined as having low reliability in the left original image. Similarly, the computation part 25 counts the pixel in the total number TR1 of pixels determined as having low reliability in the right original image (S4).

On the other hand, if the edge intensity eL is not equal to or lower than the threshold value EL1, the edge intensity determination section 241 determines that the pixel of the left original image is not a pixel having low reliability but a pixel having high reliability. Similarly, if the edge intensity eR is not equal to or lower than the threshold value ER1, the edge intensity determination section 241 determines that the pixel of the right original image is not a pixel having low reliability but a pixel having high reliability (S3-2). The pixel not determined as a pixel having low reliability is referred to as a pixel having high reliability. Steps S2 to S4 are repeated with respect to all the pixels of the left original image and the right original image in the pixels in the first region w (S5).

Subsequently, the abnormality determination part 26 determines whether or not the total number TL1 of pixels having low reliability exceeds a predetermined value QL1. Similarly, the abnormality determination part 26 determines whether or not the total number TR1 exceeds a predetermined value QR1 (S6). The predetermined values QL1 and QR1 are set in advance. The predetermined values QL1 and QR1 may be equal to or different from each other. If the total number TL1 of pixels having low reliability exceeds the predetermined value QL1, the abnormality determination part 26 determines that the left original image is abnormal (not normal). Similarly, if the total number TR1 exceeds the predetermined value QR1, the abnormality determination part 26 determines that the right original image is abnormal (not normal) (S7). When the abnormality determination part 26 determines that at least one of the original images is abnormal, it determines that the parallax image is also abnormal. The output part 54 can output information indicating this determination result, e.g., information indicating that an abnormal parallax image has been detected. Regardless of abnormal parallax image or normal parallax image, the distance computation part 53 computes a depth distance on the basis of parallax image formed by removing pixels having low reliability. In the case where the total number TL1 of pixels having low reliability has not exceeded the predetermined value QL1 and where the total number TR1 has not exceeded the predetermined value QR1, determination by the parallax value determination section 242 is executed. Also, it may be possible to modify the above method so that a total number of pixels of the parallax image, which each has low reliability, is determined based upon the pixels of the left and right original images classified as being low reliability. That is, it is presumed that if a pixel of the left or right original images is of low reliability, the corresponding pixel of the parallax image, which is formed based upon the pixel of low reliability from the left or right original images, is also unreliable. If a total number of low reliability pixels of the parallax image is more than a predetermined threshold, the parallax image is determined to be abnormal.

Figure 7:
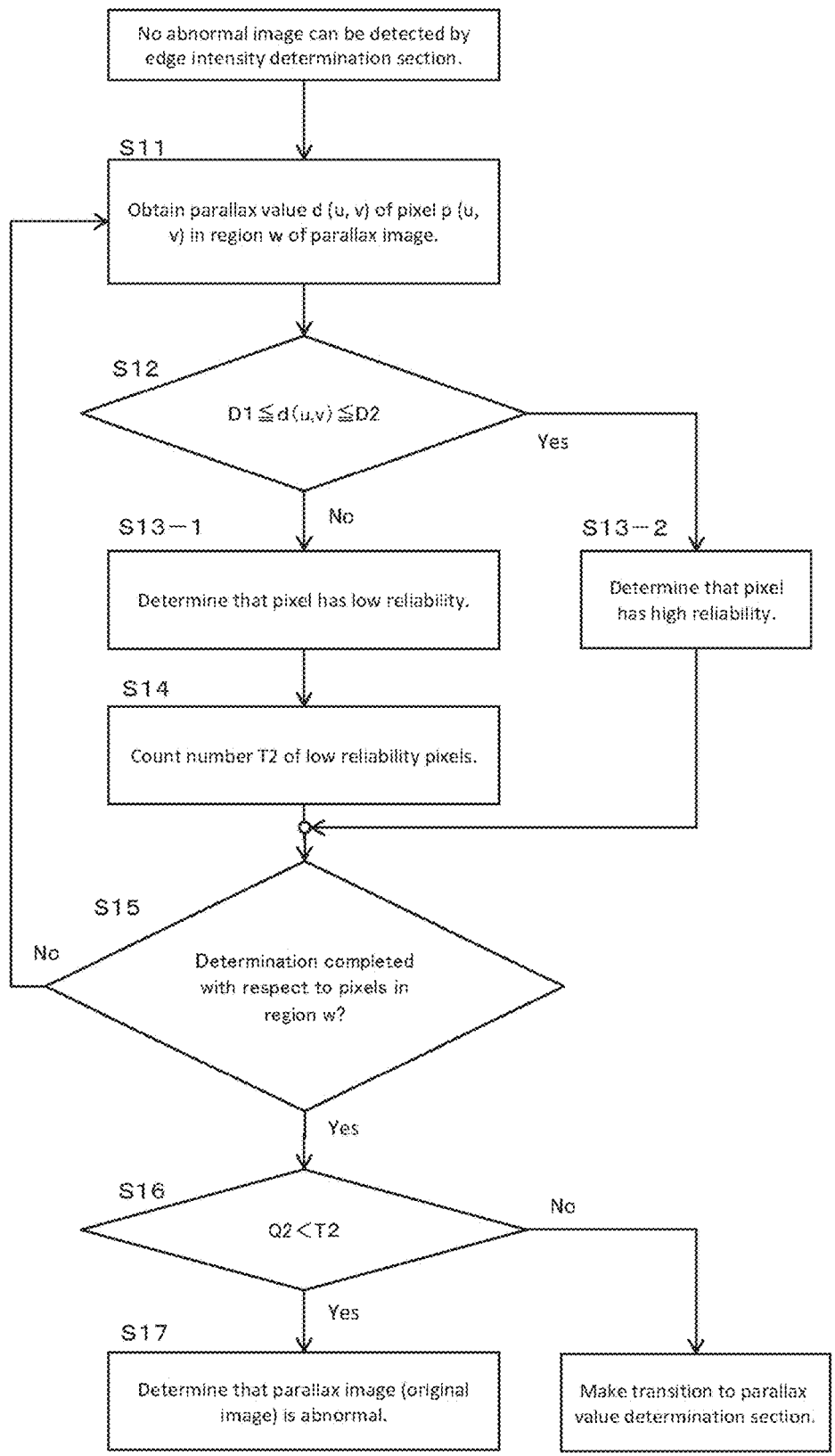
FIG. 7 is a flowchart of reliability determination by a parallax value determination section.

A method of parallax value determination as performed by the parallax value determination section will be described with reference to FIG. 7. In the present embodiment, a first region, a second region and a third region in a parallax image relating to the parallax value determination are described as the same region w. However, the method is not limited to this. A modification may be made to the present embodiment such that the first region, the second region and the third region are different from each other.

If a parallax value d (u, v) of the pixel p (u, v) in the second region of a parallax image is out of a predetermined range, the parallax value determination section 242 determines that reliability of the pixel p (u, v) is low. The parallax value determination section 242 first obtains the parallax value d (u, v) of the pixel p (u, v) (S11). The parallax value can be obtained by a conventional method.

The parallax value determination section 242 checks whether or not the parallax value d (u, v) is equal to or higher than a lower limit value D1 and equal to or lower than an upper limit value D2 (S12). The lower limit value D1 and the upper limit value D2 are set in advance. If the parallax value d (u, v) is equal to or higher than the lower limit value D1 and equal to or lower than the upper limit value D2, the parallax value determination section 242 determines that the pixel has low reliability (S13-1). If the pixel is determined as having low reliability, the computation part 25 counts the pixel in the total number T2 of pixels having low reliability (S14). On the other hand, if the parallax value d (u, v) is not equal to or higher than the lower limit value D1 and not equal to or lower than the upper limit value D2, the parallax value determination section 242 determines that the pixel of the right original image is not a pixel having low reliability but a pixel having high reliability (S13-2). Steps S12 to S14 are repeated with respect to all the pixels in the second region w (S15).

Subsequently, the abnormality determination part 26 determines whether or not the total number T2 of pixels having low reliability exceeds a predetermined value Q2 (S16). The predetermined value Q2 is set in advance. If the total number T2 of pixels having low reliability exceeds the predetermined value Q2, the abnormality determination part 26 determines that the parallax image and at least one of the original images are abnormal (not normal) (S17). When the images are determined as abnormal, the output part 54 can output information indicating this determination result, e.g., information indicating that an abnormal parallax image has been detected. Regardless of abnormal parallax image or normal parallax image, the distance computation part 53 computes a depth distance on the basis of the parallax image formed by removing pixels having low reliability. In the case where the total number T2 of pixels having low reliability has not exceeded the predetermined value Q2, determination by the parallax value difference determination section 243 is executed.

Figure 8:
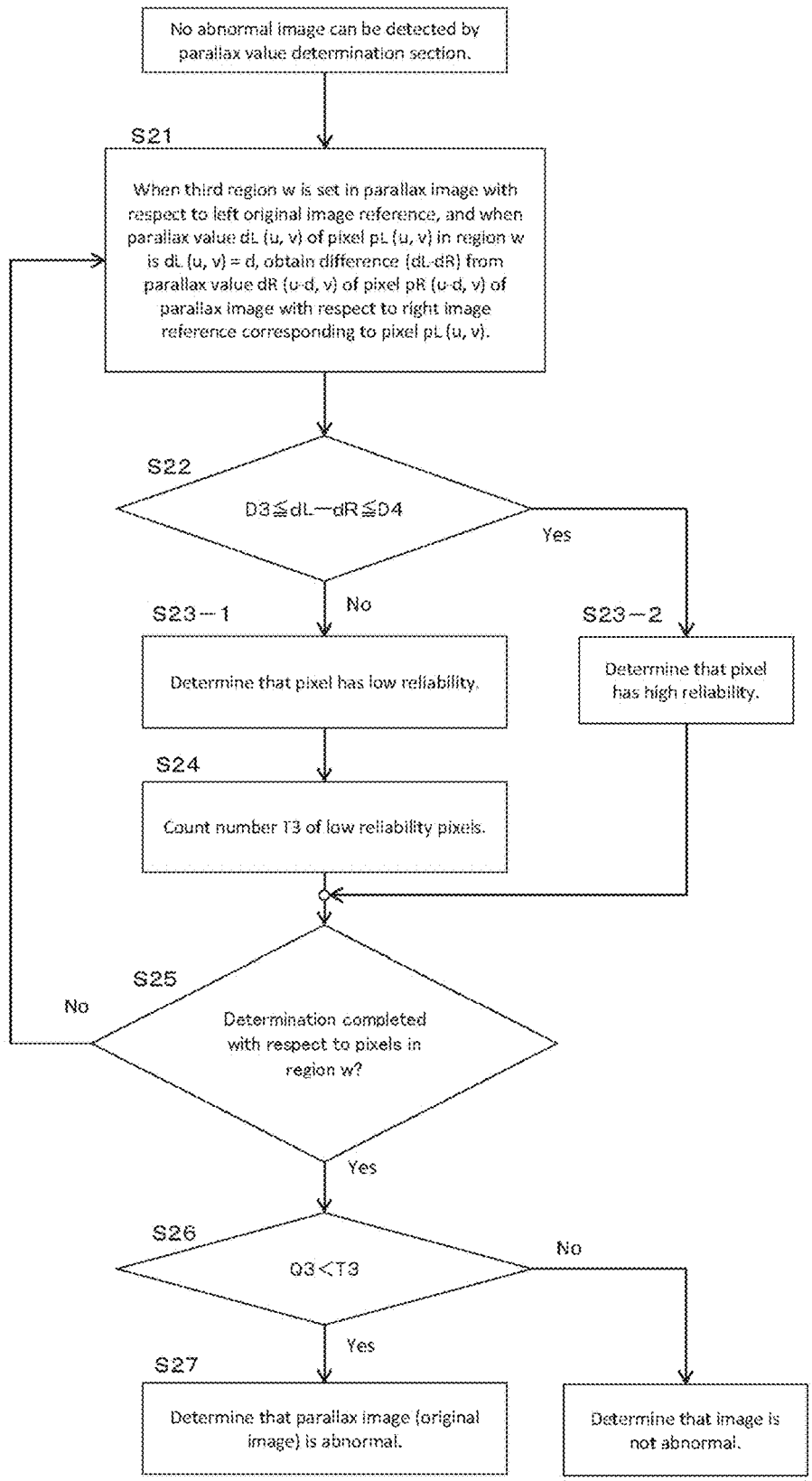
FIG. 8 is a flowchart of reliability determination by a parallax value difference determination section.

A method of parallax value determination as performed by the parallax value determination difference section will be described with reference to FIG. 8. For example, a third region w is set in a parallax image with respect to a left original image reference, and a parallax value dL (u, v) of a pixel pL (u, v) in this region w is dL (u, v)=d. In this case, if the difference (dL−dR) from a parallax value dR of a pixel pR (u−d, v) of the parallax image with respect to a right original image reference, corresponding to the pixel pL (u, v), is out of a predetermined range, the parallax value difference determination section 243 determines that the pixel pL (u, v) has low reliability. A modification may be made to the present embodiment such that a fourth region w is set in a parallax image with respect to a right original image reference and the reliability is determined with respect to a pixel pR (u, v). In such a case, the parallax value of the parallax image with respect to a left original image reference corresponding to the parallax value dR (u, v)=d of the parallax image with respect to the right original image reference is dL (u+d, v). If the difference (dL−dR) is out of a predetermined range, the parallax value difference determination section 243 determines that the pixel pR (u, v) has low reliability. The third region and the fourth region may be identical to or different from each other. The parallax image with respect to the left original image reference and the parallax image with respect to the right original image reference are prepared by the parallax image preparation part 52. The parallax value difference determination section 243 first obtains the parallax value difference (dL−dR) (S21).

The parallax value difference determination section 243 checks whether or not the parallax value difference (dL−dR) is equal to or higher than a lower limit value D3 and equal to or lower than an upper limit value D4 (S22). The lower limit value D3 and the upper limit value D4 are set in advance. If the parallax value difference (dL−dR) is equal to or higher than a lower limit value D3 and equal to or lower than an upper limit value D4, the parallax value difference determination section 243 determines that the pixel pL (u, v) has low reliability (S23-1).

Figures 9A, 9B, 10:
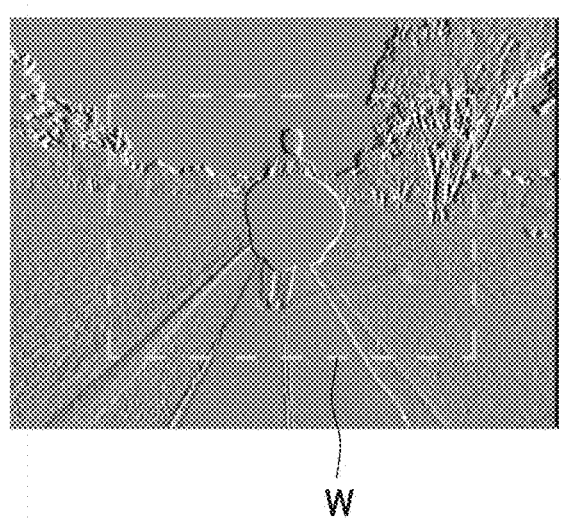
FIGS. 9A and 9B are explanatory diagrams for obtaining a parallax value difference.
FIG. 10 shows an example of an image formed by edge-enhancing the left original image in FIG. 4A.

An example of the process of obtaining a parallax value difference will be described with reference to FIGS. 9A and 9B. FIG. 9A shows parallax values of a parallax image with respect to a left original image reference. FIG. 9B shows parallax values of a parallax image with respect to a right original image reference. For FIGS. 9A and 9B, the same coordinates are extracted. Comparison is made between the parallax image with respect to the left original image reference and the parallax image with respect to the right original image reference. In a frame of the parallax image with respect to the left original image reference, the u-coordinate is 18 and the parallax value is 4. If the difference of the u-coordinate (the amount of displacement) is 4, the corresponding u-coordinate of the parallax image with respect to the right original image reference at the same v-coordinate is 14 (=18−4), and the parallax value at the u-coordinate 14 is 9. The parallax value difference is "5 (=9−4)". When D3=0 and D4=1, the parallax value difference is "5" exceeds D4. The pixel at this coordinate is therefore determined as having low reliability.

If the pixel is determined as having low reliability, the computation part 25 counts the pixel in the total number T3 of pixels having low reliability (S24). If the parallax value difference (dL−dR) is not equal to or higher than a lower limit value D3 and not equal to or lower than an upper limit value D4, the parallax value difference determination section 243 determines that the pixel pL (u, v) is not a pixel having low reliability but a pixel having high reliability (S23-2). Steps S22 to S24 are repeated with respect to all the pixels in the third region w (S25).

Subsequently, the abnormality determination part 26 determines whether or not the total number T3 of pixels having low reliability exceeds a predetermined value Q3 (S26). The predetermined value Q3 is set in advance. If the total number T3 of pixels having low reliability exceeds the predetermined value Q3, the abnormality determination part 26 determines whether or not the parallax image and at least one of the original images are abnormal (not normal) (S27). When the images are determined as abnormal, the output part 54 can output information indicating this determination result, e.g., information indicating that an abnormal parallax image has been detected. Regardless of abnormal parallax image or normal parallax image, the distance computation part 53 computes a depth distance on the basis of the parallax image formed by removing pixels having low reliability. In the case where the total number T3 of pixels having low reliability has not exceeded the predetermined value Q3, the abnormality determination part 26 determines that the parallax image and the original images are not abnormal.

(Modified Examples of Embodiment 1)

In Embodiment 1 described above, the edge intensity determination section 241 determines whether or not the edge intensity is equal to or lower than a threshold value. The operation of this section is not limited to this. The edge intensity determination section 241 may determine whether or not the edge intensity is within a predetermined range.

In Embodiment 1 described above, the edge intensity may be, for example, a value (luminance value) after processing by an edge enhancement means such as a SOBEL filter. FIG. 10 shows an example of an image obtained by edge-enhancing the left original image shown in FIG. 4A.

In Embodiment 1 described above, the parallax value determination section 242 may determine that the corresponding pixel p (u, v) has low reliability, when the parallax value d (u, v) is equal to or lower than a threshold value.

In Embodiment 1 described above, the parallax value determination section 242 may determine that the pixel has low reliability when the parallax value difference (dL−dR) is equal to or lower than a threshold value.

In Embodiment 1 described above, the edge intensity determination section 241 performs processing on a left original image and processing on a right original image in parallel with each other (S1 to S7). The operation of this section is not limited to this. The edge intensity determination section 241 may perform processing on one of the original images and thereafter execute processing on the other original image.

In Embodiment 1 described above, processing by the edge intensity determination section 241, processing by the parallax value determination section 242 and processing by the parallax value difference determination section 243 are executed in this order. The processing order is not limited to this. The order of processing by the edge intensity determination section 241, processing by the parallax value difference determination section 243 and processing by the parallax value determination section 242 may alternatively be selected.

In Embodiment 1 described above, an arrangement not having the abnormal image detection device 2 provided on the vehicle 1 may alternatively be adopted. In such a case, the image processing system 5 and the abnormal image detection device 2 are connected to each other via a network. Also, an arrangement not having the image processing system 5 provided on the vehicle 1 may alternatively be adopted. Images taken by the image pickup part 51 provided on the vehicle 1 are transmitted to the image processing system 5 via a network.

In Embodiment 1 described above, the parallax image preparation part 52 may prepare a parallax image from images obtained by making various corrections to images taken with the left image sensor 511 and the right image sensor 512. In such a case, the image processing system 5 has an image correction part (not shown) for performing various kinds of correction processing on images. Images corrected by the image correction part are output to the parallax image preparation part 52. Examples of image correction processing are luminance correction processing for correcting luminance variation between the plurality of image sensors, for example, due to the apertures and colors of lenses, distortion correction processing for correcting distortions due to the lenses for the image sensors and edge enhancement processing for enhancing edges of taken images. At least one of these kinds of image processing may be executed for image correction. The evenness of characteristics of images deriving from intrinsic characteristics of the left and right image sensors 511 and 512 can be improved by performing at least one of processing for luminance correction between the left and right image sensors 511 and 512, processing for correcting lens distortions and processing for enhancing edges. The accuracy of parallax images prepared on the basis of taken images can be improved by reducing individual variations between the left and right image sensors 511 and 512, thus enabling parallax discontinuity portions to be detected with accuracy.

Embodiment 1 described above may further have an index computation part that computes an index of a standard deviation (dispersion) of parallax values in a predetermined region (pixels) of a parallax image. If the index computed by the index computation part is out of a predetermined range (or the index exceeds an upper limit threshold value), the abnormality determination part determines that the parallax image is abnormal. With this arrangement, it is possible to determine, through determination of large variation in parallax value, that an original image is abnormal. The "predetermined region of a parallax image" is, for example, the whole pixel region or a central region defined by removing an end region from the whole pixel region. In the end region, the plurality of image pickup parts have different image pickup areas. It is, therefore, preferable to exclude the end region in advance. The "predetermined region of a parallax image" may be the same as one of the above-described "first region of a parallax image", "second region of the parallax image" and "third region of the parallax image" or may be different from these regions.

The above-described "first region of a parallax image", "second region of the parallax image" and "third region of the parallax image" are each a central region defined by removing an end region from the entire region. However, the first to third regions are not limited to this. Each of the first to third regions may be the entire region.

Embodiment 1 described above may further have a pixel value difference calculation part that calculates, with respect to pixels in a predetermined region of at least two of original images, the difference between pixel values (luminance values) of pixels of the original images at the same coordinates, and an index calculation part that calculates one or more indexes selected from the total, average, maximum, minimum and standard deviation of the differences between the pixel values obtained by the pixel value difference calculation part. If the index is out of a predetermined range (or the index exceeds an upper limit threshold value), the abnormality determination part determines that at least one of the two original images is abnormal. With this arrangement, it is possible to determine, through determination of a large difference in luminance value, that an original image is abnormal. The "predetermined region of original images" is, for example, the whole pixel region or central region defined by removing an end region from the whole pixel region.

The vehicle 1 in Embodiment 1 described above has a front windshield provided in front of the image pickup part in the image pickup direction. However, the present invention is not limited to this. For example, the image pickup part may be provided on a front portion of the vehicle.

In Embodiment 1, regardless of abnormal parallax image or normal parallax image, the distance computation part 53 computes a depth distance on the basis of the parallax image formed by removing pixels having low reliability. However, it is not limited to the above but may be the following. The distance computation part may compute a depth distance on the basis of a parallax image other than the parallax image in which an abnormality has been detected. When computing a depth distance by using a parallax image in which an abnormality has been detected, the distance computation part uses a parallax image formed by removing pixels having low reliability.

(Embodiment 2)

Figure 15:
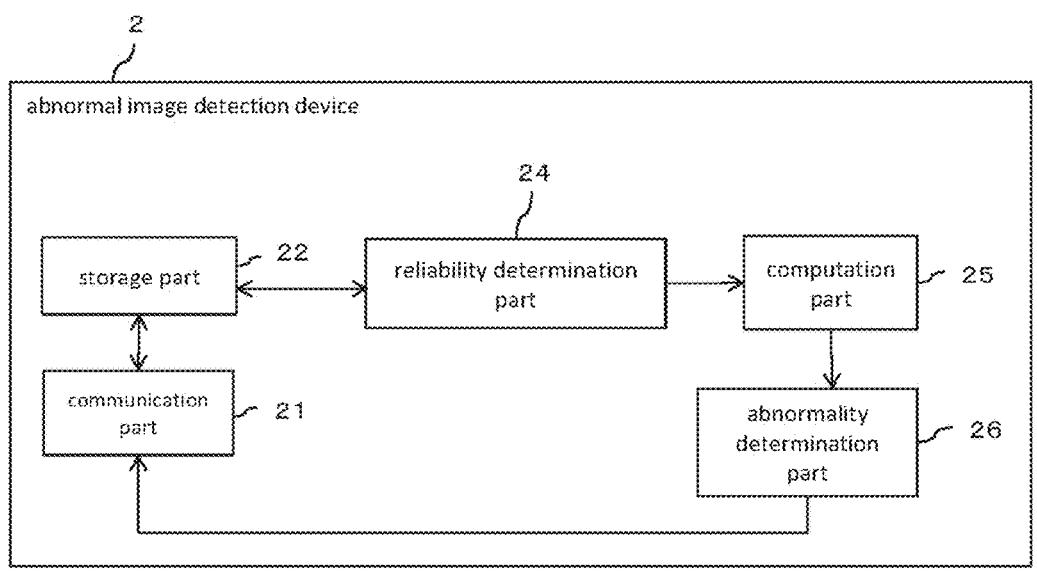
FIG. 15 is a function block diagram of an abnormal image detection device according to Embodiment 2.

An abnormal image detection device 2 according to Embodiment 2 is arranged as a device separate from the image processing system 5. The abnormal image detection device 2 shown in FIG. 15 further has a communication part 21 (corresponding to the acquisition part) that receives a left original image, a right original image and a parallax image from an external device, and a storage part 22 that stores the left original image, right original image and parallax image received by the communication part 21. The communication part 21 has a function to transmit information about an original image and a parallax image determined as abnormal to the external device or a different device. The communication part 21 transmits, for example, information for identification of original images and parallax images to the external device or the different device. The external device may be the image processing system 5 or a server of an information processing device connected to the abnormal image detection device 2 via a network.

EXAMPLE

Figure 11A:
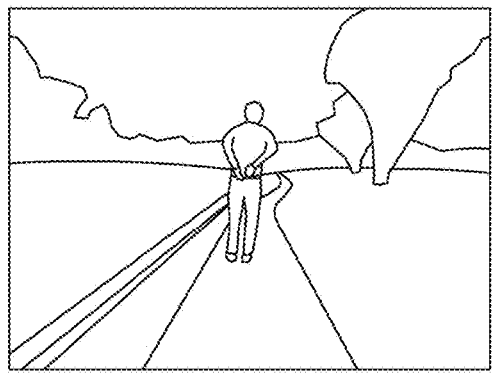
FIGS. 11A and 11B show an example of original images with no attached extraneous material.
Figure 11B:
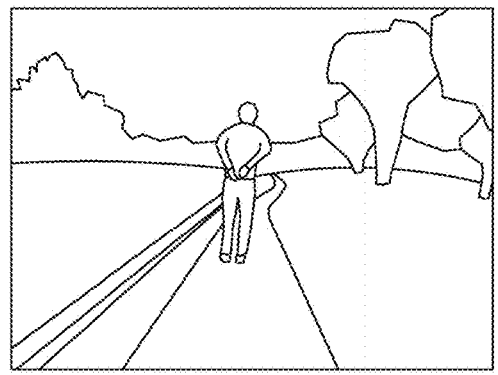
Figure 12:
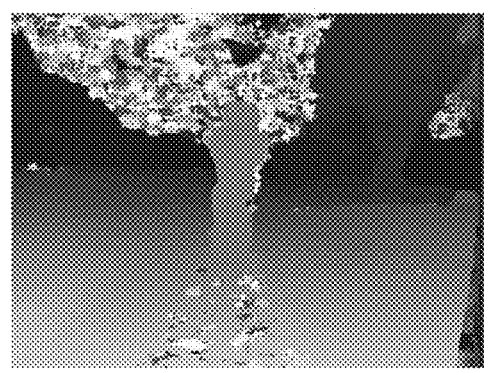
FIG. 12 shows an example of a parallax image prepared by using the original image shown in FIGS. 11A and 11B.
Figure 13:
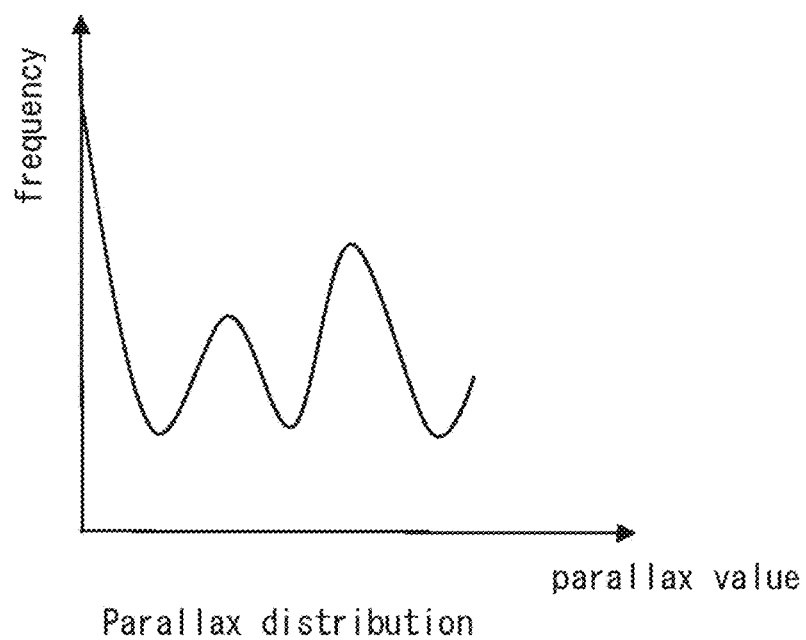
FIG. 13 is a diagram showing a parallax distribution in the parallax image shown in FIG. 12.
Figure 14:
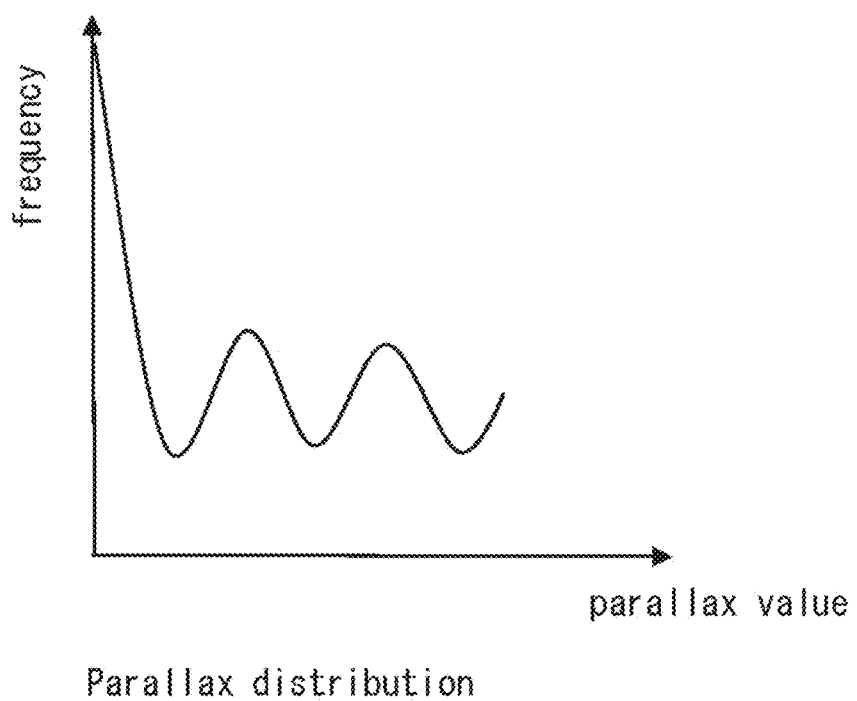
FIG. 14 is a diagram showing a parallax distribution in the parallax image shown in FIG. 5.

The reliability determination in Embodiment 1 described above and reliability determination using the parallax distribution in the above-mentioned patent literature were made by using a parallax image in a state with an attached extraneous material and a parallax image in a state without an extraneous material. FIG. 11A shows a left original image with no attached extraneous material, and FIG. 11B shows a right original image with no attached extraneous material. FIG. 12 shows the parallax image from the left and right original images. The parallax image with an attached extraneous material is the image shown in FIG. 5. FIG. 13 shows a parallax distribution in the parallax image shown in FIG. 12. FIG. 14 shows a parallax distribution in the parallax image shown in FIG. 5. The abscissa represents the parallax value in the parallax distribution, and the ordinate represents the frequency of the parallax value.

In the determination according to Embodiment 1 described above, it was possible to determine that the left original image with an attached extraneous material was abnormal. In determination using the parallax distribution according to Japanese Patent Laid-Open No. 2014-6243, the difference of the parallax distribution in the case where an extraneous material was attached from the parallax distribution in the case where no extraneous material was attached was only such that the frequency of a certain parallax was reduced. Thus, it was difficult for the determination method according to Japanese Patent Laid-Open No. 2014-6243 to accurately determine that the image was abnormal.

(Other Embodiments)

An abnormal image detection device according to another embodiment is an abnormal image detection device that detects whether or not a parallax image, which have been prepared on the basis of a plurality of original images obtained from a plurality of image pickup parts, and at least one of the plurality of original images are abnormal, and that has an index computation part that computes an index of a standard deviation (dispersion) of parallax values in a predetermined region (pixels) of the parallax image, and an abnormality determination part that determines that the parallax image is abnormal if the index computed by the index computation part is out of a predetermined range (or if the index exceeds an upper limit threshold value). With this arrangement, it is possible to determine, through a determination of large variation in parallax value, that an original image is abnormal. The abnormal image detection device may further has the components of the abnormal image detection device 2 according to Embodiment 1 or 2 described above and the functions of the components.

An abnormal image detection device according to still another embodiment is an abnormal image detection device that detects whether or not a parallax image, which have been prepared on the basis of a plurality of original images obtained from a plurality of image pickup parts, and at least one of the plurality of original images are abnormal, and that has a pixel value difference calculation part that calculates, with respect to pixels in a predetermined region of at least two of the original images, the difference between pixel values (luminance values) of pixels of the original images at the same coordinates, an index calculation part that calculates one or more indexes selected from the total, average, maximum, minimum and standard deviation of the differences between the pixel values obtained by the pixel value difference calculation part, and an abnormality determination part that determines that at least one of the two original images is abnormal if the index is out of a predetermined range (or the index exceeds an upper limit threshold value). With this arrangement, it is possible to determine, through a determination of a large difference in luminance value, that an original image is abnormal. The abnormal image detection device may further has the components of the abnormal image detection device 2 according to Embodiment 1 or 2 described above and the functions of the components.

Each "threshold value" according to the present invention may be a fixed value determined in advance or a corrected value obtained by correcting a fixed value on the basis of an environmental condition or a travel condition.

Also, if a predetermined value is represented by A; another predetermined value is represented by B; and A is smaller than B, "within a predetermined range" according to the present invention includes all the following conditions:
being larger than A and smaller than B; being larger than A and smaller than or equal to B; being larger than or equal to A and smaller than or equal to B; and being larger than or equal to A and smaller than B.

The vehicle according to the present invention is not limited to golf cars. The vehicle is not limited in the number of wheels. The vehicle may be a saddle-ride vehicle, which comprises types of motorcycle other than scooters. The saddle-ride vehicle may be any of vehicles other than motorcycles such as all terrain vehicles (ATVs). The saddle-ride vehicle means a vehicle straddled by a rider to ride.

REFERENCE SIGNS LIST

1 Vehicle
2 Abnormal image detection device
21 Communication part
22 Storage part
24 Reliability determination part
241 Edge intensity determination section
242 Parallax value determination section
243 Parallax value difference determination section
25 Computation part
26 Abnormality determination part
5 Image processing system
51 Image pickup part
52 Parallax image preparation part
53 Distance computation part
54 Output part

What is claimed is:

1. An abnormal image detection device that detects whether or not at least one of a plurality of original images is abnormal, the plurality of original images being obtained from an image pickup detector and used to prepare a parallax image, the parallax image having a plurality of pixels, the abnormal image detection device comprising:
a reliability determination part that determines whether or not each of the pixels of the parallax image has a low reliability, the reliability determination part having
an edge intensity determination section that for each respective pixel of the plurality of original images, determines whether or not the edge intensity of the respective pixel is smaller than or equal to a threshold value, and
if the edge intensity of the respective pixel is smaller than or equal to the threshold value, determines that one of the pixels in the parallax image, which corresponds to the respective pixel, has the low reliability, and
a parallax value determination section that
determines a parallax value of each of the pixels of the parallax image,
determines whether each parallax value is out of a predetermined range, and
in each instance that a respective one of the parallax values is out of the predetermined range, determines that the pixel of the parallax image, which corresponds to the respective one of the parallax values, has the low reliability;
a computation part that computes a total number of pixels which each has the low reliability as determined by the reliability determination part; and an abnormality determination part that determines that the parallax image is abnormal, when the total number of pixels computed by the computation part exceeds a predetermined value.

2. The abnormal image detection device according to claim 1, wherein the parallax image includes at least a first parallax image (Ab) prepared based upon a first original image (A) of the plurality of original images, and a second parallax image (Ba) prepared based upon a second original image (B) of the plurality of original images, and
wherein the reliability determination part has a parallax value difference determination section that determines when a difference (d1-d2) is out of a predetermined range, that a first pixel (pA) of the first parallax image (Ab) has low reliability,
wherein d1 is a parallax value of the first pixel (pA) of the first parallax image (Ab),
wherein d2 is a parallax value of a second pixel (pB) of the second parallax image (Ba), and
further wherein the second pixel (pB) corresponds to the first pixel (pA).

3. An image processing system comprising:
the abnormal image detection device according to claim 1;
the image pickup detector, the image pickup detector including a plurality of image pickup parts obtaining the plurality of original images;
a parallax image preparation part that prepares the parallax image on the basis of the plurality of original images;
a distance computation part that computes a depth distance on the basis of the parallax image prepared by the parallax image preparation part; and
an output part that outputs abnormality information when the abnormal image detection device detects an abnormality in the original images.

4. The image processing system according to claim 3, wherein the distance computation part is configured to compute a depth distance on the basis of the parallax image other than the parallax image in which an abnormality has been detected.

5. The image processing system according to claim 3, wherein in the parallax image prepared by the parallax image preparation part, the distance computation part is configured to compute a depth distance on the basis of the parallax image formed by removing pixels having low reliability.

6. The vehicle according to claim 5, further comprising a front windshield in front of the image pickup parts in an image pickup direction in which the original images are obtained by the image pickup parts,
wherein the vehicle is free of any windshield wiper on the front windshield.

7. A vehicle incorporating the image processing system according to claim 3.

8. An abnormal image detection device that detects whether or not at least one of a plurality of original images is abnormal, the plurality of original images being obtained from an image pickup detector and used to prepare a parallax image, the abnormal image detection device comprising:
a reliability determination part including
an edge intensity determination section that determines whether or not each respective pixel of the plurality of original images is of low reliability by classifying the respective pixel as being of low reliability when an edge intensity of the respective pixel is smaller than or equal to a threshold value, and
a parallax value determination section that
determines a parallax value of each of the pixels of the parallax image,
determines whether each parallax value is out of a predetermined range, and
in each instance that a respective one of the parallax values is out of the predetermined range, determines that the pixel of the parallax image, which corresponds to the respective one of the parallax values, has the low reliability;
a computation part that computes a total number of pixels which each has the low reliability as determined by the reliability determination part; and
an abnormality determination part that determines that the parallax image is abnormal when the total number of pixels computed by the computation part exceeds a predetermined value.

9. An abnormal image detection device that detects whether or not at least one of a plurality of original images is abnormal, the plurality of original images being obtained from an image pickup detector and used to prepare a parallax image, the parallax image having a plurality of pixels, the abnormal image detection device comprising:
a reliability determination part that determines whether or not each of the pixels of the parallax image has a low reliability, the reliability determination part having an edge intensity determination section that for each respective pixel of the original images,
determines whether or not the edge intensity of the respective pixel is smaller than or equal to a threshold value, and
if the edge intensity of the respective pixel is smaller than or equal to the threshold value, determines that one of the pixels in the parallax image, which corresponds to the respective pixel, has the low reliability;
a computation part that computes a total number of pixels which each has the low reliability as determined by the reliability determination part; and
an abnormality determination part that determines that the parallax image is abnormal, when the total number of pixels computed by the computation part exceeds a predetermined value,
wherein the parallax image includes at least a first parallax image (Ab) prepared based upon a first original image (A) of the plurality of original images, and a second parallax image (Ba) prepared based upon a second original image (B) of the plurality of original images, and
wherein the reliability determination part has a parallax value difference determination section that determines when a difference (d1-d2) is out of a predetermined range, that a first pixel (pA) of the first parallax image (Ab) has low reliability,
wherein d1 is a parallax value of the first pixel (pA) of the first parallax image (Ab),
wherein d2 is a parallax value of a second pixel (pB) of the second parallax image (Ba), and
further wherein the second pixel (pB) corresponds to the first pixel (pA).

10. The abnormal image detection device according to claim 9, wherein the reliability determination part has a parallax value determination section that
determines a parallax value of each of the pixels of the parallax image,
determines whether each parallax value is out of a predetermined range, and in each instance that a respective one of the parallax values is out of the predetermined range, determines that the pixel of the parallax image, which corresponds to the respective one of the parallax values, has the low reliability.

11. An image processing system comprising:
the abnormal image detection device according to claim 9;
the image pickup detector, the image pickup detector including a plurality of image pickup parts obtaining the plurality of original images;
a parallax image preparation part that prepares the parallax image on the basis of the plurality of original images;
a distance computation part that computes a depth distance on the basis of the parallax image prepared by the parallax image preparation part; and
an output part that outputs abnormality information when the abnormal image detection device detects an abnormality in the original images.

12. The image processing system according to claim 11, wherein the distance computation part is configured to compute a depth distance on the basis of the parallax image other than the parallax image in which an abnormality has been detected.

13. The image processing system according to claim 11, wherein in the parallax image prepared by the parallax image preparation part, the distance computation part is configured to compute a depth distance on the basis of the parallax image formed by removing pixels having low reliability.

14. The vehicle according to claim 13, further comprising a front windshield in front of the image pickup parts in an image pickup direction in which the original images are obtained by the image pickup parts,
wherein the vehicle is free of any windshield wiper on the front windshield.

15. A vehicle incorporating the image processing system according to claim 11.

* * * * *